(12) United States Patent
Vasudevan et al.

(10) Patent No.: US 11,651,259 B2
(45) Date of Patent: *May 16, 2023

(54) NEURAL ARCHITECTURE SEARCH FOR CONVOLUTIONAL NEURAL NETWORKS

(71) Applicant: Google LLC, Mountain View, CA (US)

(72) Inventors: Vijay Vasudevan, Los Altos Hills, CA (US); Barret Zoph, Sunnyvale, CA (US); Jonathon Shlens, San Francisco, CA (US); Quoc V. Le, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 681 days.

This patent is subject to a terminal disclaimer.

(21) Appl. No.: 16/674,801

(22) Filed: Nov. 5, 2019

(65) Prior Publication Data

US 2020/0065689 A1    Feb. 27, 2020

Related U.S. Application Data

(63) Continuation of application No. 16/040,067, filed on Jul. 19, 2018, now Pat. No. 10,521,729.

(Continued)

(51) Int. Cl.
*G06N 5/04* (2006.01)
*G06N 3/04* (2006.01)
(Continued)

(52) U.S. Cl.
CPC ........... *G06N 5/046* (2013.01); *G06N 3/0445* (2013.01); *G06N 3/0454* (2013.01); *G06N 3/08* (2013.01);
(Continued)

(58) Field of Classification Search
CPC .... G06N 5/046; G06N 3/0445; G06N 3/0454; G06N 3/08; G06T 7/0002; G06T 2207/20084
See application file for complete search history.

(56) References Cited

U.S. PATENT DOCUMENTS

2016/0224903 A1   8/2016   Talathi et al.
2017/0213156 A1   7/2017   Hammon et al.
2018/0336453 A1*  11/2018  Merity ................ G06N 3/0445

FOREIGN PATENT DOCUMENTS

JP         H0554012 A       3/1993

OTHER PUBLICATIONS

Finn, Chelsea, Pieter Abbeel, and Sergey Levine. "Model-agnostic meta-learning for fast adaptation of deep networks." International conference on machine learning. PMLR, 2017. (Year: 2017).*

(Continued)

*Primary Examiner* — Eric Nilsson
(74) *Attorney, Agent, or Firm* — Fish & Richardson P.C.

(57) ABSTRACT

Methods, systems, and apparatus, including computer programs encoded on computer storage media, for determining neural network architectures. One of the methods includes generating, using a controller neural network having controller parameters and in accordance with current values of the controller parameters, a batch of output sequences. The method includes, for each output sequence in the batch: generating an instance of a child convolutional neural network (CNN) that includes multiple instances of a first convolutional cell having an architecture defined by the output sequence; training the instance of the child CNN to perform an image processing task; and evaluating a performance of the trained instance of the child CNN on the task to determine a performance metric for the trained instance of the child CNN; and using the performance metrics for the trained instances of the child CNN to adjust current values of the controller parameters of the controller neural network.

23 Claims, 3 Drawing Sheets

Related U.S. Application Data

(60) Provisional application No. 62/535,806, filed on Jul. 21, 2017.

(51) Int. Cl.
  G06N 3/08 (2006.01)
  G06T 7/00 (2017.01)
  G06N 5/046 (2023.01)

(52) U.S. Cl.
  CPC .. *G06T 7/0002* (2013.01); *G06T 2207/20084* (2013.01)

(56) References Cited

OTHER PUBLICATIONS

Bergstra, James, and Yoshua Bengio. "Random search for hyper-parameter optimization." Journal of machine learning research 13.2 (2012). (Year: 2012).*
PCT International Preliminary Report on Patentability in International Appln. No. PCT/US2018/042456, dated Jan. 21, 2020, 15 pages.
Zoph et al. "Neural Architecture Search with Reinforcement Learning," https://arxiv.org/abs/1611.01578v1, Nov. 2016, 15 pages.
JP Office Action in Japanese Application No. 2019-553406, dated Jan. 12, 2021, 5 pages (with English translation).
IN Office Action in Indian Application No. 20192703601, dated Nov. 10, 2021, 8 pages (with English translation).
EP Office Action in European Application No. 18749981.9, dated Mar. 11, 2021, 7 pages.
'scholarpedia.org' [online] "Metalearning," Schaul et al., Jun. 24, 2010, [retrieved on Aug. 1, 2018] Retrieved from Internet:URL<http://scholarpedia.org/article/Metalearning> 12 pages.
Andrychowicz et al. "Learning to learn by gradient descent by gradient descent," NIPS, Dec. 2016, 9 pages.
Angeline et al. An evolutionary Algorithm that constructs recurrent neural networks,: IEEE Transactions on Neural Networks 5.1 (1994): 54-65 (Year: 1994).
Ba et al. "Layer normalization," arXiv 1607.06450, Jul. 21, 2016, 14 pages.
Baker et al. "Designing neural network architectures using reinforcement learning," arXiv 1611.02167v3, Mar. 22, 2017, 18 pages.
Bergstra et al. "Algorithms for hyper-parameter optimization," NIPS, Dec. 2011, 9 pages.
Bergstra et al. "Making a science of model search: Hyperparameter optimization in hundreds of dimensions for vision architectures," International Conference on Machine Learning, Jun. 2013, 9 pages.
Bergstra et al. "Random search for hyper-parameter optimization," Journal of Machine learning Research, Feb. 2012, 25 pages.
Chen et al. "Dual path networks," NIPS Dec. 2017, 9 pages.
Chen et al. "Revisiting distributed synchronous sgd," arXiv 1604.00981 Mar. 21, 2017, 10 pages.
Chollet. "Xception: Deep learning with depthwise separable convolutions," arXiv 1610.02357v3, Apr. 4, 2017, 8 pages.
Clevert et al. "Fast and Accurate deep network learning by exponential linear units," arXiv 1511.07289v5, Feb. 22, 2016, 14 pages.
Deng et al. "ImageNet: A large-scale hierarchical image database," IEEE Conference on Computer Vision and Pattern Recognition, Jun. 2009, 8 pages.
Devries et al. "Improved regularization of convolutional neural networks with cutout," arXiv 1708.04552v2, Nov. 29, 2017, 8 pages.
Donahue et al. "Decaf: A deep convolutional activation feature for generic visual recognition," ICML, vol. 32, Jan. 2014, 9 pages.
Duan et al. "RL2: Fast reinforcement learning via slow reinforcement learning," arXiv 1611.02779v2, Nov. 10, 2016, 14 pages.
Finn et al. "Model-agnostic meta-learning for fast adaption of deep networks," arxiv 1703.03400, Jul. 18, 2017, 13 pages.
Fukushima. "Neocognifron: A self-organizing neural network model for a mechanism of pattern recognition unaffected by shift in position," Biological Cybernetic 36s, 1980, 10 pages.
Floreano et al. "Neuroevolution: from Architectures to learning," Evolutionary Intelligence, Mar. 2008, 16 pages.
Gastaldi. "Shake-shake regularization of 3-brach residual networks," ICLR workshop, Apr. 2017, 5 pages.
Ha et al. "Hypernetworks," International Conference on Learning Representations, Apr. 2017, 18 pages.
He et al. "Deep residual learning for image recognition," IEEE Conference on Computer Vision and Pattern Recognition, Jun. 2016, 9 pages.
He et al. "Identity mappings in deep residual networks," arXiv 1603.05027v3, Jul. 25, 2016, 15 pages.
Hochreiter et al. "Long short-term memory," Neural computation, Nov. 1997, 32 pages.
Hochreiter et al. "Learning to learn using gradient descent," Artificial Neural Networks, Aug. 2001, 8 pages.
Howard et al. "Mobilenets: Efficient convolutional neural networks for mobile vision applications," arXiv 1704.04861, Apr. 17, 2017, 9 pages.
Hu et al. "Squeeze-and-excitation networks," arXiv 1709.01507v3, Oct. 25, 2018, 14 pages.
Huang et al. "Deep networks with stochastic depth," arXiv 1603.09382v3, Jul. 28, 2016, 16 pages.
Huang et al. "Densely connected convolutional networks," arXiv 1608.06993v5, Jan. 28, 2018, 9 pages.
Huang et al. "Speed/accuracy trade-offs for modern convolutional object detectors," arXiv 1611.10012v3, Apr. 25, 2017, 21 pages.
Ioffe et al. "Batch normalization: Accelerating deep network training by reducing internal covariate shift," ICML Jun. 2015, 9 pages.
Jozefowicz et al. "An empirical exploration of recurrent network architectures," ICML Jun. 2015, 9 pages.
Krizhevsky et al. "Imagenet classification with deep convolutional neural networks," NIPS Dec. 2012, 9 pages.
Krizhevsky et al. "Learning multiple layers of features from tiny images," Technical report, University of Toronto, Apr. 8, 2009, 60 pages.
Larsson et al. "Fractalnet: Ultra-deep neural networks without residuals," arXiv 1605.07648v4, May 26, 2017, 11 pages.
LeCun et al. "Gradient-based learning applied to document recognition," Proceedings of the IEEE, Nov. 1998, 46 pages.
Li et al. "Learning to optimize neural nets," arXiv 1703.00441v2, Nov. 30, 2017, 10 pages.
Lin et al. "Focal loss for dense object detection," arXiv 1708.02002v2, Feb. 7, 2018, 10 pages.
Lin et al. "Microsoft coco: Common objects in context," arXiv 1405.0312v3, Feb. 21, 2015, 15 pages.
Loshchilov et al. "SGDR: Stochastic gradient descent with warm restarts," arXiv 1608.03983v5, May 3, 2017, 16 pages.
Mendoza et al. "Towards automatically-tuned neural networks," Proceeding of the 2016 workshop on automatic machine learning, Dec. 2016, 8 pages.
Miconi et al. "Neural networks with differentiable structure," arXiv 1606.06216v3, Aug. 6, 2016, 4 pages.
Miikkulainen et al. "Evolving deep neural networks," arXiv 1703.00548v2, Mar. 1, 2017, 8 pages.
Negrinho et al. "DeepArchitect: Automatically designing and training deep architectures," arXiv 1704.08792 Apr. 28, 2017.
PCT International Search Report and Written Opinion issued in International Application No. PCT/US2018/042456, dated Nov. 12, 2018, 21 pages.
Pinto et al. "A high-throughput screening approach to discovering good forms of biologically inspired visual representation," PLoS Computational Biology, 5(11), Nov. 2009, 12 pages.
Ravi et al. "Optimization as a model for few-shot learning," International Conference on Learning Representations, Apr. 2017, 11 pages.
Real et al. "Large-scale evolution if image classifiers," arXiv 1703.01041v2, Jun. 11, 2017, 18 pages.
Ren et al. "Faster R-CNN: Towards real-time object detection with region proposal networks," Advances in Neural Information Processing Systems, Dec. 2015, 9 pages.
Saxena et al. "Convolutional neural fabrics," NIPS, Dec. 2016 9 pages.

(56) References Cited

OTHER PUBLICATIONS

Schroff et al. "Facenet: A unified embedding for face recognition and clustering," Proceedings of the IEEE Conference on Computer Vision and Pattern Recognition, Jun. 2015, 9 pages.
Schulman et al. "Trust region policy optimization," International Conference on Machine learning, Jun. 2015, 9 pages.
Shrivastava et al. "Beyond skip connections: Top-down modulation for object detection," arXiv 1612.06851v2, Sep. 19, 2017, 11 pages.
Simonyan et al. "Very deep convolutional networks for large-scale image recognition," arXiv 1409.1556v6, Apr. 10, 2015, 14 pages.
Snoek et al. "Practical Bayesian optimization of machine learning algorithms," NIPS Dec. 2012, 9 pages.
Snoek et al. "Scalable Bayesian optimization using deep neural networks," International Conference on Machine Learning, Jun. 2015, 10 pages.
Srivastava et al. "Dropout: a simple way to prevent neural networks from overfitting," Journal of Machine Learning Research, 15(1) Jan. 2014, 30 pages.
Stanley et al. "A hypercube-based encoding for evolving large-scale neural networks," Artificial Life, Apr. 2009, 39 pages.
Szegedy et al. "Going deeper with convolutions," IEEE Conference on Computer Vision and Patter Recognition, Jun. 2015, 9 pages.
Szegedy et al. "Inception-v4, inception-resnet and the impact of residual convention on learning," arXiv 1602.07261v2, Aug. 23, 2016, 12 pages.
Szegedy et al. "Rethinking the inception architecture for computer vision," IEEE Conference on Computer Vision and Pattern Recognition, Jun. 2016, 9 pages.
Ulyanov et al. "Instance normalization: The missing ingredient for fast stylization," arXiv 1607.08022v3, Nov. 6, 2017, 6 pages.
Wang et al. "Learning to reinforcement learn," arXiv 1611.05763v3, Jan. 23, 2017, 17 pages.
Weyand et al. "Planet-photo geolocation with convolutional neural networks," arXiv 1602.05314, Feb. 17, 2016, 10 pages.
Wichrowska et al. "Learned optimizers that scale and generalize," arXiv 1703.04813v4, Sep. 7, 2017, 11 pages.
Wierstra et al. "Modeling systems with internal state using evolino," The Genetic and Evolutionary Computation Conference, Jun. 2005, 8 pages.
Williams. "Simple statistical gradient-following algorithms for connectionist reinforcement learning," Machine Learning, May 1992, 28 pages.
Xie et a; "Aggregated residual transformations for deep neural networks," arXiv 1611.05431v2, Apr. 11, 2017, 10 pages.
Xie et al. "Genetic CNN," arXiv 1703.01513, Mar. 2017, 10 pages.
Zhang et al. "Polynet: A pursuit of structural diversity in very deep netowks," arXiv 1611.05725v2 Jul. 17, 2017, 9 pages.
Zhang et al. "Shufflenet: An extremely efficient convolutional neural network for mobile devices," arXiv 1707.01083v2 Dec. 7, 2017, 9 pages.
Zhong et al. "Practical Block-wise Neural Network Architecture Generation," arXiv 1708.05552 May 14, 2018, 11 pages.
Zoph et al. "Neural architecture search with reinforcement learning," arXiv1611.01578v2, Feb. 15, 2017, 16 pages.
EP Office Action in European Application No. 18749981.9 dated Oct. 1, 2019, 3 pages.
Schulman et al., "Proximal policy optimization algorithms," arXiv, Aug. 28, 2017, 12 pages.
Office Action in Chinese Appln. No. 201880022762.8, dated Nov. 28, 2022, 8 pages (with English Translation).

* cited by examiner

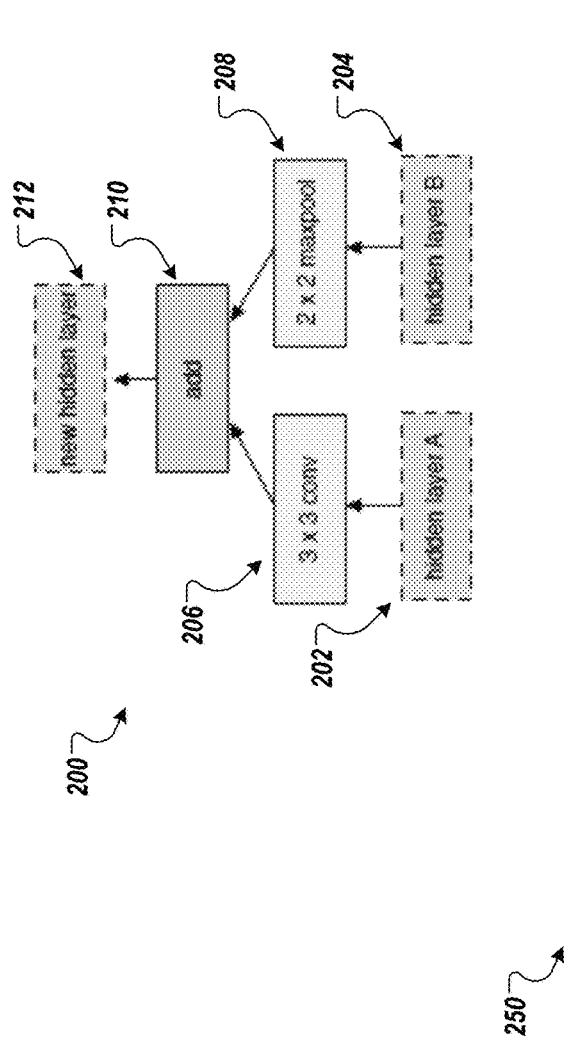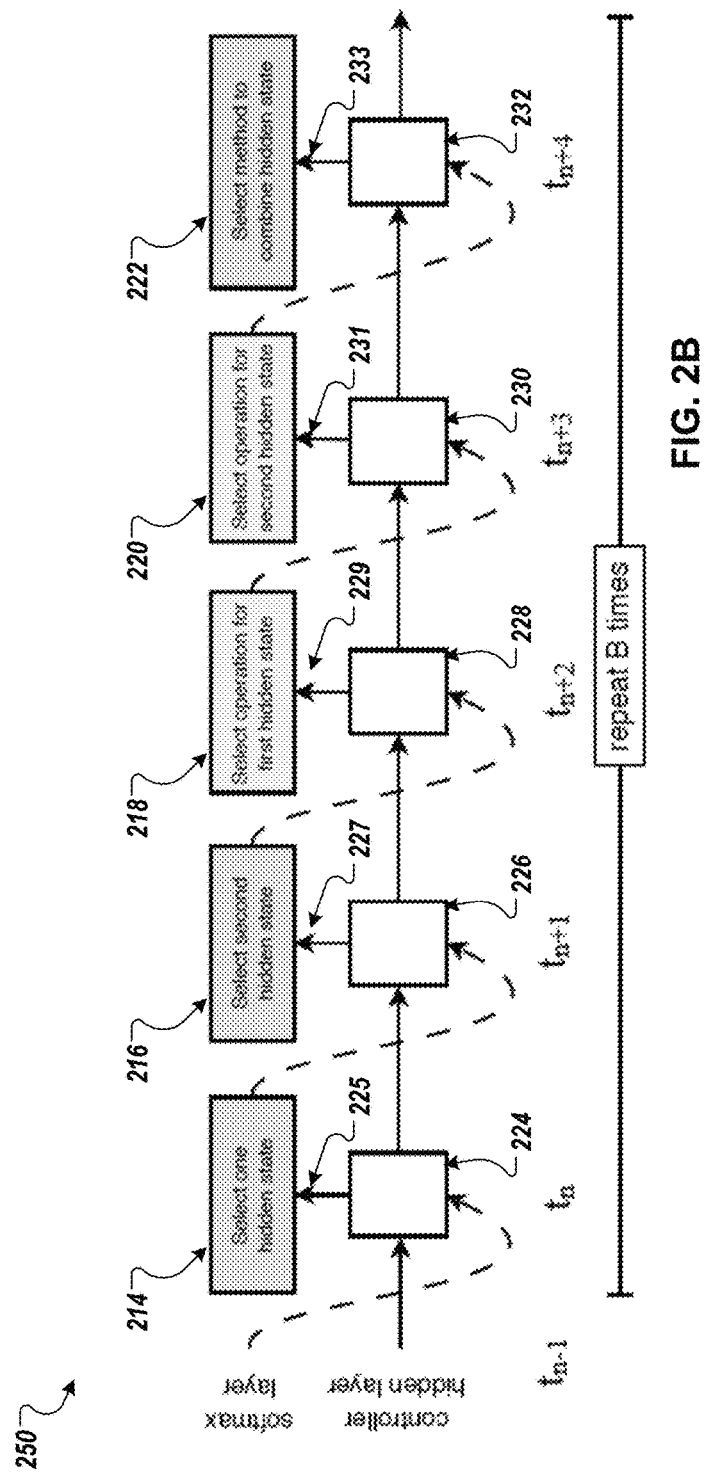

NEURAL ARCHITECTURE SEARCH FOR CONVOLUTIONAL NEURAL NETWORKS

CROSS-REFERENCE TO RELATED APPLICATION

This application is a continuation application of U.S. application Ser. No. 16/040,067, filed on Jul. 19, 2018, which claims the benefit of U.S. Provisional Application Ser. No. 62/535,806, filed on Jul. 21, 2017. The entire contents of each are hereby incorporated by reference in the disclosure of this application.

BACKGROUND

This specification relates to determining architectures for convolutional neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system implemented as computer programs on one or more computers in one or more locations that determines a network architecture for a convolutional neural network by determining an architecture for a convolutional cell that is repeated throughout the network architecture.

The subject matter described in this specification can be implemented in particular embodiments so as to realize one or more of the following advantages. By predicting the architecture of one or more types of convolutional cells and then re-using the same architecture for each convolutional cell of that type that appears in the convolutional neural network, the system effectively limits the search space of possible architectures without adversely affecting and, in some cases, even improving the performance of the resulting architecture. Thus, by effectively limiting the search space of possible architectures as described in this specification, the system can determine an architecture that matches or exceeds the performance of architectures discovered by other techniques that search a larger space of architectures while using many fewer computational resources than the other techniques. Additionally, the system can effectively determine the architecture of the convolutional cells on a smaller data set and then re-use the same cell architecture across a range of data and computational scales. In particular, the system can effectively employ the resulting learned architecture to perform image processing tasks with reduced computational budgets that match or outperform streamlined architectures targeted to mobile and embedded platforms.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2A shows an example operation block of the first convolutional cell.

FIG. 2B is a diagram of an example of the controller neural network generating an output sequence.

Like reference numbers and designations in the various drawings indicate like elements.

DETAILED DESCRIPTION

This specification describes a system implemented as computer programs on one or more computers in one or more locations that determines, using a controller neural network, a network architecture for a child convolutional neural network by determining an architecture for a first convolutional cell that is repeated throughout the network architecture. The child convolutional neural network (CNN) is configured to perform an image processing task.

Generally, the child CNN is configured to receive an input image and to process the input image to generate a network output for the input image. For example, the output generated by the neural network for a given image may be scores for each of a set of object categories, with each score representing an estimated likelihood that the image contains an image of an object belonging to the category. As another example, the output generated by the neural network can be a numeric embedding of the input image. As yet another example, the output generated by the neural network can identify locations in the input image at which particular types of objects are depicted.

Figure 1:
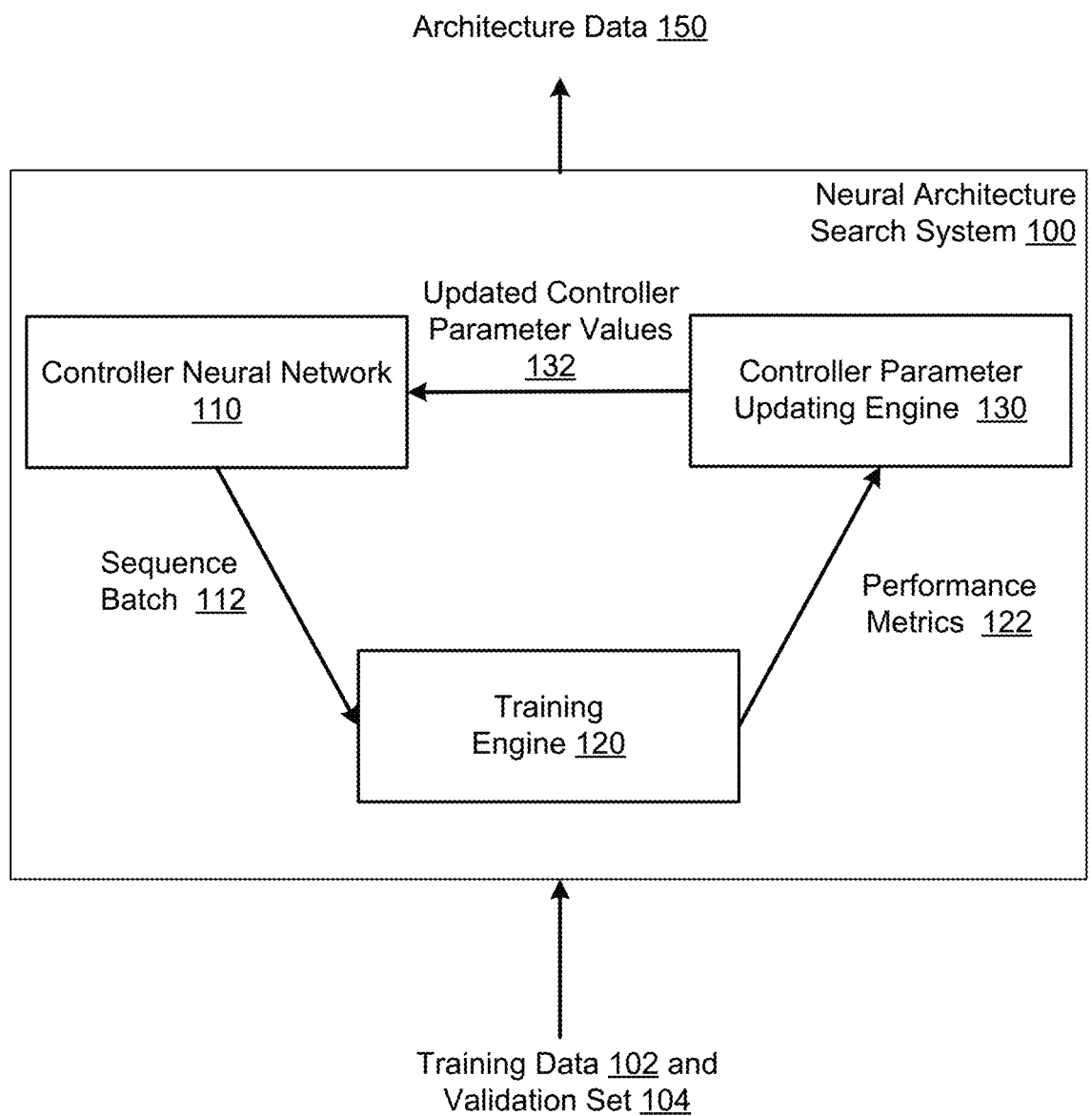
FIG. 1 shows an example neural architecture search system.

FIG. 1 shows an example neural architecture search system 100. The neural architecture search system 100 is an example of a system implemented as computer programs on one or more computers in one or more locations, in which the systems, components, and techniques described below can be implemented.

The neural architecture search system 100 is a system that obtains training data 102 for training a convolutional neural network to perform a particular task and a validation set 104 for evaluating the performance of the convolutional neural network on the particular task and uses the training data 102 and the validation set 104 to determine an network architecture for a child CNN that is configured to perform the image processing task. In particular, the system 100 determines, using a controller neural network, a network architecture for a child CNN by determining an architecture for a first convolutional cell that is repeated throughout the network architecture. That is, the child CNN includes multiple instances of the first convolutional cell. The number of filters of convolutional operations within the instances of the first convolutional cell may differ based on a position of the instances within the child CNN.

Generally, the training data 102 and the validation set 104 both include a set of input images and, for each input image, a respective target output that should be generated by the child CNN to perform the image processing task. For example, a larger set of training data may have been randomly partitioned to generate the training data 102 and the validation set 104.

The system 100 can receive the training data 102 and the validation set 104 in any of a variety of ways. For example, the system 100 can receive training data as an upload from a remote user of the system over a data communication network, e.g., using an application programming interface (API) made available by the system 100, and randomly divide the uploaded data into the training data 102 and the validation set 104. As another example, the system 100 can receive an input from a user specifying which data that is already maintained by the system 100 should be used for training the convolutional neural network, and then divide the specified data into the training data 102 and the validation set 104.

As shown in FIG. 1, the neural architecture search system 100 includes a controller neural network 110, a training engine 120, and a controller parameter updating engine 130.

The controller neural network 110 is a neural network that has parameters, referred to in this specification as "controller parameters." In particular, the controller neural network is a recurrent neural network that includes one or more recurrent neural network layers and one or more output layers. An output layer can be a softmax neural network layer. An example architecture of the controller neural network is described in more detail below with reference to FIG. 2B.

The controller neural network 110 is configured to generate a batch of output sequences in accordance with the controller parameters. Each output sequence generated by the controller neural network 110 defines a respective possible architecture for a first convolutional cell and, optionally, one or more other convolutional cells that are also repeated throughout the child convolutional neural network. The first convolutional cell is configured to receive a cell input and to generate a cell output. The cell output may have a same dimension as the cell input, e.g., the same height, width, and depth. For example, the first convolutional cell may receive a feature map as input and to generate an output feature map having the same dimension as the input feature map.

The first convolutional cell includes a sequence of B operation blocks, where B is a predetermined positive integer. For example, B can be three, five, or ten. Each operation block in the first convolutional cell receives one or more respective input hidden states and generates a respective output hidden state. An example architecture of an operation block is described in more detail below with reference to FIG. 2A.

Each output sequence includes a respective output at each of multiple time steps and each time step in the output sequence corresponds to a different hyperparameter of the architecture of the first convolutional cell. Thus, each output sequence includes, at each time step, a respective value of the corresponding hyperparameter. Collectively, the values of the hyperparameters in a given output sequence define an architecture for the first convolutional cell. Generally, a hyperparameter is a setting that affects the operations that are performed by the first convolutional cell. Hyperparameters of the first convolutional cell are set prior to the commencement of the training of a child CNN having multiple instances of the first convolutional cell. These hyperparameters are not learned during the training of the child CNN, i.e., these hyperparameters do not change during the training of the child CNN. Output sequences and possible hyperparameters are discussed in more detail below with reference to FIGS. 2A-2B and 3.

In some implementations, each output sequence in the batch further defines an architecture for a second convolutional cell configured to receive a second cell input and to generate a second cell output having a smaller height, a smaller width, or both from the second cell input. For example, the second convolutional cell may receive a feature map as input and generate an output feature map where the feature map height and width are reduced by a factor of two. Similar to the first convolutional cell, the second convolutional cell includes a sequence of operation blocks, where the number of operation blocks in the second convolutional cell is a predetermined positive integer. The second convolutional cell may have the same number of operation blocks as the first convolutional cell (i.e., B blocks). Each operation block in the second convolutional cell receives one or more respective input hidden states and generates a respective output hidden state. In these implementations, an instance of the child CNN for each output sequence also includes multiple instances of the second convolutional cell having the architecture defined by the output sequence. For example, an instance of the child CNN may include (i) three instances of the first convolutional cell, and (ii) two or three instances of the second convolutional cell.

In these implementations, each output sequence includes a respective output at each of multiple time steps and each time step in the output sequence corresponds to a different hyperparameter of the architecture of the first convolutional cell and the second convolutional cell. Thus, each output sequence includes, at each time step, a respective value of the corresponding hyperparameter. Collectively, the values of the hyperparameters in a given output sequence define an architecture for the first convolutional cell and the second convolutional cell. Generally, a hyperparameter is a setting that affects the operations that are performed by the first convolutional cell or the second convolutional cell. Hyperparameters of the first convolutional cell and the second convolutional cell are set prior to the commencement of the training of a child CNN having multiple instances of the first convolutional cell and multiple instances of the second convolutional cell. These hyperparameters are not learned during the training of the child CNN, i.e., these hyperparameters do not change during the training of the child CNN.

Generally, the system 100 determines the architecture for the first convolutional cell by training the controller neural network 110 to adjust the values of the controller parameters.

In particular, during an iteration of the training procedure, the system 100 generates a batch of output sequences 112 using the controller neural network 110 in accordance with current values of the controller parameters.

For each output sequence in the batch 112, the training engine 120 generates an instance of a child CNN that includes multiple instances of the first convolutional cell that has the architecture defined by the output sequence. Each instance includes the same number of components that are connected in the same directed graph. In particular, each instance includes the same number of instances of the first cell at predetermined positions in the directed graph. However, the architectures of the first cells are different between different instances. When the output sequence also defines architectures for the second convolutional cell, each instance also includes multiple second convolutional cells at predetermined positions in the graph.

For example, an instance of the child CNN may include N first convolutional cells followed by a second convolutional cell followed by N first convolutional cells followed by a second convolutional cell and followed by N first convolutional cells.

As another example, an instance of the child CNN may include one or more second convolutional cells, followed by N first convolutional cells followed by a second convolutional cell followed by N first convolutional cells followed by a second convolutional cell and followed by N first convolutional cells. N is an integer greater than one.

Each instance may also include other components that have fixed architectures and are not defined by the output sequence, i.e., an output layer and/or one or more other types of layers at various predetermined positions in the directed graph.

The training engine 120 trains an instance of the child CNN to perform the image processing task, i.e., by training the instance on the training data 102. The training engine 120 evaluates a performance of the trained instance of the child CNN on the image processing task (i.e., by evaluating the performance of the trained instance on the validation set 104) to determine a performance metric for the trained instance of the child CNN.

The controller parameter updating engine 130 then uses the performance metrics for the trained instances of the child CNN to adjust the current values of the controller parameters of the controller neural network 110. The current values of the controller parameters are adjusted to improve the expected performance of the architectures defined by the output sequences generated by the controller neural network 110 on the image processing task. Evaluating the performance of trained instances and updating the current values of the controller parameters is described in more detail below with reference to FIG. 3.

The system can repeatedly generate batches of output sequences and adjust the values of the controller parameters in the above-described manner.

By repeatedly updating the values of the controller parameters in this manner, the system 100 can train the controller neural network 110 to generate output sequences that result in child neural networks that have increased performance on the image processing task, i.e., to maximize the expected accuracy on the validation set 104 of the architectures proposed by the controller neural network 110.

Once trained values of the controller parameters have been determined, i.e., once the training of the controller neural network 110 has satisfied some termination criteria, the system determines a final architecture for the first convolutional cell (and any other convolutional cells that are defined by the output sequences generated by the controller neural network). For example, the system 100 can generate a final output sequence in accordance with the trained values of the controller parameters and use the architecture defined by the final output sequence as the final architecture for the first convolutional cell and any other convolutional cells. As another example, the system 100 can select the output sequence that resulted in the child CNN that performed the best on the validation set 104 during the training and use the architecture defined by the output sequence as the final architecture of the first convolutional cell and any other convolutional cells.

The neural network search system 100 can then output architecture data 150 that specifies the architecture of the convolutional neural network that includes the first convolutional cell (and any other convolutional cells that are defined by the output sequences). For example, the output architecture data 150 includes data specifying the operation blocks that are part of the first convolutional cell and any other convolutional cells, the connectivity between the operation blocks, the operations performed by the operation blocks, and the connectivity between the cells. For example, the neural network search system 100 can output the architecture data 150 to the user that submitted the training data.

In some implementations, instead of or in addition to outputting the architecture data 150, the system 100 trains an instance of the child CNN having multiple instances of the determined convolutional cell, e.g., either from scratch or to fine-tune the parameter values generated as a result of training the instance of the child CNN having multiple instances of the convolutional cell, and then uses the trained child CNN to process requests received by users, e.g., through the API provided by the system. That is, the system 100 can receive inputs to be processed, use the trained child CNN to process the inputs, and provide the outputs generated by the trained child CNN or data derived from the generated outputs in response to the received inputs.

After training, the system can generate an architecture for the first convolutional cell and/or the second convolutional cell using the adjusted values of the controller parameters. In some cases, the system can then generate a computationally-efficient architecture of a convolutional neural network that includes fewer instances of the first convolutional cell and/or fewer instances of the second convolutional cell than the child CNN instances, where the instances of the first convolutional cell (and/or the second convolutional cell) have the generated architecture. In some other cases, the system can generate a larger architecture of a convolutional neural network that includes more instances of the first convolutional cell and/or more instances of the second convolutional cell than the child CNN instances for use in a more complex image processing task, where the instances of the first convolutional cell (and/or the second convolutional cell) have the generated architecture.

FIG. 2A shows an example operation block 200 of the first convolutional cell.

The operation block 200 is configured to apply a first operation 206 to a first input hidden state 202 to the operation block to generate a first output. The operation block 200 is configured to apply a second operation 208 to a second input hidden state 204 to the operation block to generate a second output. The operation block 200 is then configured to apply a combining operation 210 to the first and second outputs to generate an output hidden state 212 for the operation block. The first input hidden state 202, the second input hidden state 204, the first operation 206, the second operation 208, and the combining operation 210 can be defined by an output sequence generated by a controller neural network as described in detail below with reference to FIG. 2B. The first convolutional cell can have multiple, i.e., B total, operation blocks arranged in a sequence, with the hyperparameters of each of the multiple operation blocks being defined by the output sequence.

FIG. 2B is a diagram 250 of an example of the controller neural network 110 generating an output sequence.

The controller neural network 110 is configured to predict possible architectures for a first convolutional cell that includes B operation blocks. Accordingly, the predictions of the controller neural network 110 for the first convolutional cell can be grouped into B groups, where each group has a predetermined number of prediction steps that are performed by the controller neural network 110 in order to determine a respective operation block. That means the total number of prediction steps performed by the controller neural network 110 is 5×B steps.

The diagram 250 depicts five example prediction steps performed by the controller neural network 110 at five time steps $t, \ldots, t_{n+4}$, respectively, during the generation of an output sequence. The controller neural network 110 repeats the above five prediction steps B times corresponding to the B operation blocks in the first convolutional cell. As will be described in more detail below, each of the five time steps $t, \ldots, t_{n+4}$ corresponds to a different hyperparameter of the architecture of the child CNN.

Generally, a hyperparameter is a setting that affects the operations that are performed by the first convolutional cell. For example, to predict an architecture of the first convolutional cell that includes a sequence of B operation blocks, the controller neural network 110 generates an output sequence that includes values for B sets of hyperparameters. Each set of hyperparameters corresponds to one of the B operation blocks. For instance, the set of hyperparameters corresponding to the operation block 200 of FIG. 2A includes the following hyperparameters: a first hyperparameter representing which hidden state is used as the first input hidden state, a second hyperparameter representing which hidden state is used as the second input hidden state, a third hyperparameter representing which operation is used as the first operation, a fourth hyperparameter representing which operation is used as the second operation, and a fifth hyperparameter representing which operation is used as the combing operation to combine the outputs of first operation and the second operation.

The controller neural network 110 is a recurrent neural network that includes one or more recurrent neural network layers, e.g., layer 224, that are configured to, for each time step, receive as input the value of the hyperparameter corresponding to the preceding time step in the given output sequence and to process the input to update a current hidden state of the recurrent neural network. For example, the recurrent layers in the controller neural network 110 can be long-short term memory (LSTM) layers or gated recurrent unit (GRU) layers. In the example of FIG. 2B, at time step $t_n$, the layer 224 receives as input the value of the hyperparameter from the preceding time step $t_{n-1}$ and updates the hidden states of the layer from time step $t_{n-1}$ to generate as output an updated hidden state 225.

The controller neural network 110 also includes a respective output layer for each time step in the output sequence, e.g., output layers 214, 216, 218, 220, and 222 for time steps $t_n, t_{n+1}, t_{n+2}, t_{n+3}$, and $t_{n+4}$, respectively. Each of the output layers is configured to receive an output layer input that includes the updated hidden state at the time step and to generate an output for the time step that defines a score distribution over possible values of the hyperparameter at the time step. For example, each output layer can first project the output layer input into the appropriate dimensionality for the number of possible values for the corresponding hyperparameter and then apply a softmax to the projected output layer input to generate a respective score for each of multiple possible values for the hyperparameter at the time step.

To generate a hyperparameter value for a given time step in an output sequence, the system 100 provides as input to the controller neural network 110 the value of the hyperparameter at the preceding time step in the output sequence and the controller neural network 110 generates an output for the time step that defines a score distribution over possible values of the hyperparameter at the time step. For the very first time step in the output sequence, because there is no preceding time step, the system 100 can instead provide a pre-determined placeholder input. The system 100 then samples from the possible values in accordance with the score distribution to determine the value of the hyperparameter at the time step in the output sequence. The possible values that a given hyperparameter can take are fixed prior to the training of the child CNN and the number of possible values can be different for different hyperparameters.

As illustrated in diagram 250, the output layer 214 for time step $t_n$ is configured to receive an input that includes the hidden state 225 and to generate a respective score for each of multiple possible values for a hyperparameter that represents which hidden state is used as a first input hidden state for an operation block (e.g., operation block 200 of FIG. 2A). The source for the first input hidden state for the operation block is selected from one or more of: (i) outputs generated by one or more preceding convolutional cells in the sequence of convolutional cells in the child CNN (ii) an input image of the child CNN, or (iii) output hidden states of preceding operation blocks in the sequence of operation blocks within the first convolutional cell.

The output layer 216 for time step $t_{n+1}$ is configured to receive an input that includes the hidden state 227 and to generate a respective score for each of multiple possible values for a hyperparameter that represents which hidden state is used as a second input hidden state for the operation block. The source for the second input hidden state for the operation block selected from one or more of: (i) outputs generated by one or more preceding convolutional cells in the sequence of convolutional cells, (ii) the input image, or (iii) output hidden states of preceding operation blocks in the sequence of operation blocks within the convolutional cell.

The output layer 218 for time step $t_{n+2}$ is configured to receive an input that includes the hidden state 229 and to generate a respective score for each of multiple possible values for a hyperparameter that represents an operation type for a first operation to be applied to the first input hidden state. The first operation can be selected from a predetermined set of convolutional neural network operations. For example, the predetermined set of convolutional neural network operations may include one or more of the following operations: identity, 1×7 then 7×1 convolution, 3×3 average pooling, 5×5 max pooling, 1×1 convolution, 3×3 depthwise-separable convolution, 7×7 depthwise-separable convolution, 1×3 then 3×1 convolution, 3×3 dilated convolution, 3×3 max pooling, 7×7 max pooling, 3×3 convolution, and 5×5 depthwise-separable convolution.

The output layer 220 for time step $t_{n+3}$ is configured to receive an input that includes the hidden state 231 and to generate a respective score for each of multiple possible values for a hyperparameter that represents an operation type for a second operation to be applied to the second input hidden state. The second operation can be selected from the above predetermined set of convolutional neural network operations.

The output layer 222 for time step $t_{n+4}$ is configured to receive an input that includes the hidden state 233 and to generate a respective score for each of multiple possible values for a hyperparameter that represents an operation type for a combining operation that is used to combine the outputs of the first operation and the second operation to generate a new hidden state for the operation block. The combining operation can be selected from a predetermined set of combining operations. For example, the predetermined set of combining operations may include (i) element-wise addition between two outputs, and (ii) concatenation between two outputs along the filter dimension.

The first convolutional cell is configured to generate the cell output for the cell input by combining output hidden states of blocks in the first convolutional cell that are not selected as inputs to any of the blocks in the first convolutional cell. For example, the first convolutional cell can concatenate all unused output hidden states together in depth to generate the final cell output.

Figure 3:
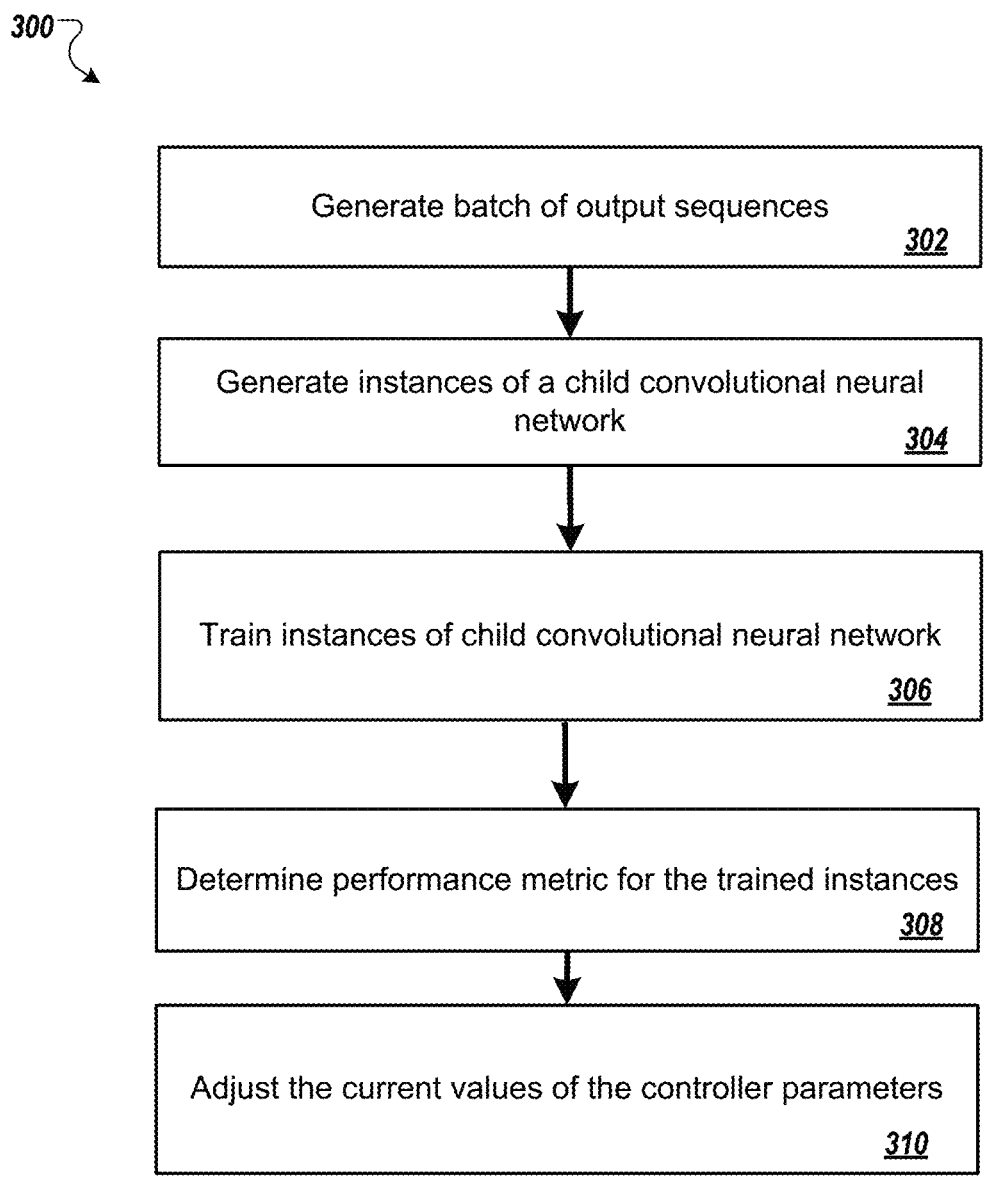
FIG. 3 is a flow diagram of an example process for updating current values of controller parameters.

FIG. 3 is a flow diagram of an example process for updating current values of controller parameters of a controller neural network. For convenience, the process 300 will be described as being performed by a system of one or more computers located in one or more locations. For example, a neural architecture search system, e.g., the neural architecture search system 100 of FIG. 1, appropriately programmed, can perform the process 300.

The system can repeatedly perform the process 300 to train the controller neural network, i.e., to determine trained values of the controller parameters from initial values of the controller parameters.

The system generates a batch of output sequences using the controller neural network and in accordance with current values of the controller parameters as of the iteration (step 302). Each output sequence in the batch defines an architecture for a first convolutional cell that is configured to receive a cell input and to generate a cell output. The cell output of the first convolutional cell can have a same height and width as the cell input.

In particular, each output sequence includes a respective output at each of multiple time steps and each time step in the output sequence corresponds to a different hyperparameter of the architecture of the first convolutional cell. Thus, each output sequence includes, at each time step, a respective value of the corresponding hyperparameter. Collectively, the values of the hyperparameters in a given output sequence define an architecture for the first convolutional cell. In particular, because, as described above, the system samples from a score distribution when generating each hyperparameter value in an output sequence, the sequences in the batch will generally be different even though they are each generated in accordance with the same controller parameter values. The batch generally includes a pre-determined number of output sequences, e.g., eight, sixteen, thirty-two, or sixty-four sequences.

For each output sequence in the batch, the system generates an instance of a child CNN that includes multiple instances of the first convolutional cell having the architecture defined by the output sequence (step 304). For example, the child CNN may include three instances of the first convolutional cell. The number of filters of convolutional operations within the instances of the first convolutional cell may differ based on a position of the instances within the child CNN.

In some implementations, each output sequence in the batch further defines an architecture for a second convolutional cell configured to receive a second cell input and to generate a second cell output having a smaller height, a smaller width, or both from the second cell input. In these implementations, an instance of the child CNN for each output sequence also includes multiple instances of the second convolutional cell having the architecture defined by the output sequence. For example, an instance of the child CNN may include (i) three instances of the first convolutional cell, and (ii) two or three instances of the second convolutional cell.

The system trains the instance of the child neural network to perform an image processing task (step 306). That is, for each output sequence in the batch, the system generates an instance of the child CNN that includes multiple instances of the first convolutional cell having an architecture defined by the output sequence and trains the instance of the child CNN on the received training data to perform the particular neural network task. The system trains the instance of the child CNN using a conventional machine learning training technique that is appropriate for the task, e.g., stochastic gradient descent with backpropagation. In some implementations, the system parallelizes the training of the instances of the child CNN to decrease the overall training time for the controller neural network. The system can train each instance of the child CNN for a specified amount of time (i.e., training each instance until a specific amount of time has elapsed) or for a specified number of training iterations. After the training, different instances of the first convolutional cell in the trained instance of the child CNN can have different parameter values.

For each output sequence in the batch, the system evaluates the performance of the corresponding trained instance of the child CNN on the image processing task to determine a performance metric for the trained instance on the particular neural network task (step 308). For example, the performance metric can be an accuracy of the trained instance on the validation set as measured by an appropriate accuracy measure. For example, the accuracy can be a classification error rate when the task is a classification task or an intersection over union difference measure when the task is a regression task. As another example, the performance metric can be an average or a maximum of the accuracies of the instance the instance for each of the last two, five, or ten epochs of the training of the instance.

The system uses the performance metrics for the trained instances of the child CNN to adjust the current values of the controller parameters of the controller neural network (step 310).

In particular, the system adjusts the current values by training the controller neural network to generate output sequences that result in child CNNs having increased performance metrics using a machine learning technique. More specifically, the system trains the controller neural network to generate output sequences that maximize a received reward that is determined based on the performance metrics of the trained instances. In particular, the reward for a given output sequence is a function of the performance metric for the trained instance. For example, the reward can be one of: the performance metric, the square of the performance metric, the cube of the performance metric, the square root of the performance metric, and so on.

In some cases, the system trains the controller neural network to maximize the expected reward using a policy gradient technique.

For example, the policy gradient technique can be a REINFORCE technique. For instance, the system can estimate the gradient of the expected reward with respect to the controller parameters using an estimator of the gradient that satisfies:

$$\frac{1}{m}\sum_{k=1}^{m}\sum_{t=1}^{T}\nabla_{\theta_c}\log\left|P(a_t\mid a_{(t-1):1};\theta_c)(R_k-b),\right.$$

where m is the number of sequences in the batch, T is the number of time steps in each sequence in the batch, $a_t$ is the output at time step t in a given output sequence, $R_k$ is the reward for output sequence k, $\theta_c$ are the controller parameters, and b is a baseline function, e.g., the exponential moving average of previous architecture accuracies.

As another example, the policy gradient technique can be a Proximal Policy Optimization (PPO) technique. Specifically, the system can train the controller neural network using PPO by employing a global workqueue system for generating a pool of child CNNs controlled by the controller neural network. The PPO technique is described in more detail in J. Schulman, F. Wolski, P. Dhariwal, A. Radford, and O. Klimov. Proximal policy optimization algorithms. arXiv preprint arXiv:1707.06347, 2017.

As yet another example, the policy gradient technique can be a Trusted Region Policy Optimization (TRPO) technique, which is described in detail in John Schulman, Sergey Levine, Philipp Moritz, Michael I. Jordan, Pieter Abbeel, "Trust Region Policy Optimization," Proceedings of the $31^{st}$ International Conference on Machine Learning, Lille, France, 2015.

In some implementations, the system trains the controller neural network in a distributed manner. That is, the system maintains multiple replicas of the controller neural network and updates the parameters values of the replicas asynchronously during the training. That is, the system can perform the steps 302-308 asynchronously for each replica and can update the controller parameters using the gradients determined for each of the replicas.

After training, the system can generate an architecture for the first convolutional cell using the adjusted values of the controller parameters.

In some cases, the system can then generate a computationally-efficient architecture of a convolutional neural network that includes fewer instances of the first convolutional cell than the child CNN instances, where the instances of the first convolutional cell have the generated architecture. This technique allows the system to leverage the additional computational capacity available during the evaluation while still keeping the final architecture sufficiently computationally efficient so as to be deployed on a mobile device or in another resource-constrained environment.

In some other cases, the system can generate a larger architecture of a convolutional neural network that includes more instances of the first convolutional cell than the child CNN instances for use in a more complex image processing task, where the instances of the first convolutional cell have the generated architecture. This technique improves the computational efficiency of the process and allows the system to be able to achieve high performance without needing to repeatedly evaluate the larger architecture during the process.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
generating, using a controller neural network having a plurality of controller parameters and in accordance with current values of the controller parameters, a batch of output sequences,
   each output sequence in the batch defining an architecture for a first convolutional cell configured to receive a cell input and to generate a cell output, and
   the first convolutional cell comprising a sequence of a predetermined number of operation blocks that each receive one or more respective input hidden states and generate a respective output hidden state, wherein one or more operation blocks in the sequence are configured to perform one or more convolution operations on one or more respective input hidden states that the one or more operation blocks receive;
for each output sequence in the batch:
   generating an instance of a child convolutional neural network that includes multiple instances of the first convolutional cell having the architecture defined by the output sequence;
   training the instance of the child convolutional neural network to perform an image processing task; and
   evaluating a performance of the trained instance of the child convolutional neural network on the image processing task to determine a performance metric for the trained instance of the child convolutional neural network;
using the performance metrics for the trained instances of the child convolutional neural network to adjust the current values of the controller parameters of the controller neural network; and
generating a final architecture for the first convolutional cell using the controller neural network in accordance with the adjusted values of the controller parameters.

2. The method of claim 1, wherein, after the training, different instances of the first convolutional cell in the trained instance of the child convolutional neural network have different parameter values.

3. The method of claim 1, wherein each of the one or more operation blocks in the sequence of the predetermined number of operations blocks included in the first convolutional cell is configured to:
apply a first operation to a first input hidden state to generate a first output;
apply a second operation to a second input hidden state to generate a second output; and
apply a combining operation to the first and second outputs to generate an output hidden state.

4. The method of claim 3, wherein each output sequence in the batch defines, for each of the one or more operation blocks:
a source for the first input hidden state for the operation block selected from one or more of: (i) outputs generated by one or more other components of the child convolutional neural network, (ii) an input image, or (iii) output hidden states of preceding operation blocks in the sequence of operation blocks within the first convolutional cell;
a source for the second input hidden state for the operation block selected from one or more of: (i) outputs generated by one or more preceding convolutional cells in the sequence of convolutional cells, (ii) the input image, or (iii) output hidden states of preceding operation blocks in the sequence of operation blocks within the convolutional cell;
an operation type for the first operation selected from a predetermined set of convolutional neural network operations; and
an operation type for the second operation selected from the predetermined set of convolutional neural network operations.

5. The method of claim 4, wherein each output sequence in the batch further defines, for each of the one or more operation blocks of the first convolutional cell:
an operation type for the combining operation selected from a predetermined set of combining operations.

6. The method of claim 4, wherein the first convolutional cell is further configured to: generate the cell output by combining output hidden states of blocks in the first convolutional cell that are not selected as inputs to any of the blocks in the first convolutional cell.

7. The method of claim 1, wherein using the performance metrics for the trained instances of the child convolutional neural network to adjust the current values of the controller parameters of the controller neural network comprises:
training the controller neural network to generate output sequences that result in child convolutional neural networks having increased performance metrics using a machine learning training technique.

8. The method of claim 7, wherein the training technique is a policy gradient technique.

9. The method of claim 7, wherein the training technique is a REINFORCE technique.

10. The method of claim 7, wherein the training technique is Proximal Policy Optimization (PPO) technique.

11. The method of claim 7, further comprising:
using at least one of the child convolutional neural networks having increased performance metrics to perform the image processing task.

12. The method of claim 11, wherein the controller neural network is a recurrent neural network that comprises:
one or more recurrent neural network layers that are configured to, for a given output sequence and at each time step:
   receive as input the value of hyperparameter at the preceding time step in the given output sequence, and to process the input to update a current hidden state of the recurrent neural network; and
a respective output layer for each time step, wherein each output layer is configured to, for the given output sequence:
   receive an output layer input comprising the updated hidden state at the time step and to generate an output for the time step that defines a score distribution over possible values of the hyperparameter at the time step.

13. The method of claim 1, wherein each output sequence comprises a value for a respective hyperparameter of the first convolutional cell at each of a plurality of time steps.

14. The method of claim 13, wherein generating, using a controller neural network having a plurality of controller parameters and in accordance with current values of the controller parameters, a batch of output sequences, comprises, for each output sequence in the batch and for each of the plurality of time steps:
providing as input to the controller neural network the value of the hyperparameter at the preceding time step in the output sequence to generate an output for the time step that defines a score distribution over possible values of the hyperparameter at the time step; and sampling from the possible values in accordance with the score distribution to determine the value of the hyperparameter at the time step in the output sequence.

15. The method of claim 1, wherein a number of filters of convolutional operations within the instances of the first convolutional cell differs based on a position of the instances within the child convolutional neural network.

16. The method of claim 15, wherein each output sequence in the batch further defines an architecture for a second convolutional cell configured to receive a second cell input and to generate a second cell output having a smaller height, a smaller width, or both from the second cell input, and wherein the instance of a child convolutional neural network for each output sequence also includes multiple instances of the second convolutional cell having the architecture defined by the output sequence.

17. The method of claim 1, wherein the cell output of the first convolutional cell has a same height and width as the cell input.

18. The method of claim 1, wherein training each instance of the child convolutional neural network comprises training each instance until a particular amount of time has elapsed.

19. The method of claim 1, further comprising:
generating a computationally-efficient architecture of a convolutional neural network that includes fewer instances of the first convolutional cell than the child convolutional neural network instances, wherein the instances of the convolutional cell have the generated final architecture.

20. The method of claim 1, further comprising:
generating a larger architecture of a convolutional neural network that includes more instances of the first convolutional cell than the child convolutional neural network instances for use in a more complex image processing task, wherein the instances of the first convolutional cell have the generated final architecture.

21. The method of claim 20, further comprising:
performing the more complex image processing task using the convolutional neural network that includes more instances of the first convolutional cell than the child convolutional neural network instances.

22. A system comprising one or more computers and one or more storage devices storing instructions that when executed by the one or more computers cause the one or more computers to perform operations comprising:
generating, using a controller neural network having a plurality of controller parameters and in accordance with current values of the controller parameters, a batch of output sequences,
each output sequence in the batch defining an architecture for a first convolutional cell configured to receive a cell input and to generate a cell output, and
the first convolutional cell comprising a sequence of a predetermined number of operation blocks that each receive one or more respective input hidden states and generate a respective output hidden state, wherein one or more operation blocks in the sequence are configured to perform one or more convolution operations on one or more respective input hidden states that the one or more operation blocks receive;
for each output sequence in the batch:
generating an instance of a child convolutional neural network that includes multiple instances of the first convolutional cell having the architecture defined by the output sequence;
training the instance of the child convolutional neural network to perform an image processing task; and
evaluating a performance of the trained instance of the child convolutional neural network on the image processing task to determine a performance metric for the trained instance of the child convolutional neural network;
using the performance metrics for the trained instances of the child convolutional neural network to adjust the current values of the controller parameters of the controller neural network; and
generating a final architecture for the first convolutional cell using the controller neural network in accordance with the adjusted values of the controller parameters.

23. One or more non-transitory computer storage media storing instructions that when executed by one or more computers cause the one or more computers to perform operations comprising:
generating, using a controller neural network having a plurality of controller parameters and in accordance with current values of the controller parameters, a batch of output sequences,
each output sequence in the batch defining an architecture for a first convolutional cell configured to receive a cell input and to generate a cell output, and
the first convolutional cell comprising a sequence of a predetermined number of operation blocks that each receive one or more respective input hidden states and generate a respective output hidden state, wherein one or more operation blocks in the sequence are configured to perform one or more convolution operations on one or more respective input hidden states that the one or more operation blocks receive;
for each output sequence in the batch:
generating an instance of a child convolutional neural network that includes multiple instances of the first convolutional cell having the architecture defined by the output sequence;
training the instance of the child convolutional neural network to perform an image processing task; and
evaluating a performance of the trained instance of the child convolutional neural network on the image processing task to determine a performance metric for the trained instance of the child convolutional neural network;
using the performance metrics for the trained instances of the child convolutional neural network to adjust the current values of the controller parameters of the controller neural network; and
generating a final architecture for the first convolutional cell using the controller neural network in accordance with the adjusted values of the controller parameters.

* * * * *